US012219325B2

(12) United States Patent
Müller-Wehlau et al.

(10) Patent No.: US 12,219,325 B2
(45) Date of Patent: Feb. 4, 2025

(54) METHOD FOR LOCALIZING A SOUND SOURCE FOR A BINAURAL HEARING SYSTEM

(71) Applicant: SIVANTOS PTE. LTD., Singapore (SG)

(72) Inventors: Matthias Müller-Wehlau, Erlangen (DE); Niklas Harlander, Erlangen (DE); Christoph Lüken, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 18/610,533

(22) Filed: Mar. 20, 2024

(65) Prior Publication Data

US 2024/0323620 A1 Sep. 26, 2024

(30) Foreign Application Priority Data

Mar. 20, 2023 (DE) ..................... 10 2023 202 437.3

(51) Int. Cl.
*H04R 25/00* (2006.01)

(52) U.S. Cl.
CPC ......... *H04R 25/552* (2013.01); *H04R 25/405* (2013.01); *H04R 25/407* (2013.01); *H04R 25/505* (2013.01); *H04R 2225/43* (2013.01)

(58) Field of Classification Search
CPC .. H04R 25/552; H04R 25/405; H04R 25/407; H04R 25/505; H04R 2225/43
USPC ........................................................ 381/23.1
See application file for complete search history.

(56) References Cited

U.S. PATENT DOCUMENTS 9,253,581 B2 2/2016 Auberville et al.
9,723,414 B2 8/2017 Kamkar-Parsi et al.
10,349,189 B2 7/2019 Kamkar-Parsi et al.
2002/0041696 A1* 4/2002 Jensen ................. H04R 29/006 381/317
2013/0208896 A1* 8/2013 Chatlani .................. H04R 5/04 381/17
2021/0266682 A1 8/2021 Fischer et al.
(Continued)

FOREIGN PATENT DOCUMENTS

DE 102015211747 B4 5/2017
DE 102016225205 A1 6/2018
DE 102017215823 B3 * 9/2018 ............. H04R 25/00
(Continued)

*Primary Examiner* — Sean H Nguyen
(74) *Attorney, Agent, or Firm* — Laurence A. Greenberg; Werner H. Stemer; Ralph E. Locher

(57) ABSTRACT

A method for localizing a sound source for a binaural hearing system with first and second hearing instruments. First and second input signals are formed from an ambient sound signal and directional signals are formed by directional signal processing of the input signals. The directional signals have a minimum sensitivity in different minimum directions with respect to a preferred direction of the binaural hearing system. Based on the directional signals, first and second source directions of the sound source are determined starting from the first and second hearing instrument, respectively. Based on the source directions and a distance between the first and second hearing instruments, the distance of said sound source from a reference point of the binaural hearing system and a main direction of the said sound source are determined to thereby localize the sound source.

11 Claims, 4 Drawing Sheets

(56) References Cited

U.S. PATENT DOCUMENTS

| | | | | |
|---|---|---|---|---|
| 2022/0070579 | A1 * | 3/2022 | Fischer .................. | H04R 1/406 |
| 2023/0080855 | A1 | 3/2023 | Kamkar-Parsi et al. | |

FOREIGN PATENT DOCUMENTS

| | | | |
|---|---|---|---|
| DE | 102020202483 A1 | 8/2021 | |
| EP | 1657958 B1 | 6/2012 | |
| EP | 3490273 A1 | 5/2019 | |
| EP | 3506658 A1 | 7/2019 | |
| EP | 4149121 A1 | 3/2023 | |

* cited by examiner

METHOD FOR LOCALIZING A SOUND SOURCE FOR A BINAURAL HEARING SYSTEM

CROSS-REFERENCE TO RELATED APPLICATION

This application claims the priority, under 35 U.S.C. § 119, of German Patent Application DE 10 2023 202 437.3, filed Mar. 20, 2023; the prior application is herewith incorporated by reference in its entirety.

FIELD AND BACKGROUND OF THE INVENTION

The invention relates to a method for localizing a sound source for a binaural hearing system, wherein a plurality of first input signals are generated from a sound signal of the environment, and wherein a plurality of first directional signals are generated on the basis of the first input signals by means of directional signal processing, in such a way that each of the first directional signals has a minimum sensitivity in a different minimum direction with respect to a preferred direction of the binaural hearing system in each case. Based on the first directional signals, a first source direction of a sound source with respect to the said preferred direction is determined.

A hearing instrument generally refers to an electronic device that supports the hearing capacity of a person wearing the hearing instrument (hereafter referred to as the "wearer" or "user"). In particular, the invention relates to hearing instruments which are designed to compensate for a hearing loss of a hearing-impaired user completely or partially. Such an instrument is also known as a hearing aid. In addition, there are hearing instruments that protect or improve the hearing capacity of normal-hearing users, for example to enable improved speech comprehension in complex listening situations, or in the form of communication devices (e.g., headsets or similar, possibly with earbud-shaped headphones).

Hearing instruments in general, and hearing aids in particular, are usually designed to be worn on the head and here in particular, in or on one ear of the user. In the operation of the hearing instrument, one or more (acousto-electric) input transducers capture an ambient sound and convert this ambient sound into a corresponding electrical input signal, the voltage fluctuations of which preferably carry information on the vibrations of the air pressure induced in the air by the ambient sound. In a signal processing device (a signal processor), the or each input signal is processed (i.e., modified with regard to its sound information) in order in particular to support the hearing capacity of the user, particularly preferably to compensate for a hearing loss of the user. The signal processing device outputs a correspondingly processed audio signal as an output signal to an output transducer (e.g., a loudspeaker), which converts the output signal into an output sound signal. The output sound signal can consist of airborne sound, which is emitted into the user's auditory canal. For example, the output sound signal can also be emitted into the bones of the user's skull.

In particular, individual sound sources can be emphasized by directional signal processing (e.g., directional microphony) of multiple input signals, or noise sources can be decreased or even completely masked. Especially in more complex listening situations with multiple sound sources, only one or few of which may be considered useful signal sources, the wearer can benefit from a possible improvement in the signal-to-noise ratio (SNR). A problem with this, however, is to distinguish directed noise sources cleanly from useful signal sources in order to emphasize the signals of the determined useful signal sources by means of the described directional signal processing.

SUMMARY OF THE INVENTION

It is accordingly an object of the invention to provide a method which overcomes the above-mentioned and other disadvantages of the heretofore-known devices and methods of this general type and which provides for a method for directional signal processing for a hearing instrument or a hearing system having a hearing instrument, which allows a maximally accurate spatial localization of a useful signal source.

With the above and other objects in view there is provided, in accordance with the invention, a method for localizing a sound source (4) for a binaural hearing system having a first hearing instrument and a second hearing instrument, the method comprising:

- generating, by a plurality of first input transducers of the first hearing instrument, a plurality of first input signals from an ambient sound signal;
- generating, by a plurality of second input transducers of the second hearing instrument, a plurality of second input signals from the ambient sound signal;
- generating a plurality of first directional signals based on the first input signals by way of directional signal processing, such that each of the first directional signals has a minimum sensitivity in a different minimum direction with respect to a preferred direction of the binaural hearing system, and determining on a basis of the first directional signals a first source direction of the sound source with respect to the said preferred direction, starting from the first hearing instrument;
- generating a plurality of second directional signals based on the second input signals by way of directional signal processing, such that each of the second directional signals has a minimum sensitivity in a different minimum direction with respect to the preferred direction, and determining on a basis of the second directional signals a second source direction of the sound source with respect to the preferred direction, starting from the second hearing instrument; and
- determining, based on the first source direction, the second source direction, and a distance between the first and second hearing instruments, a distance of the sound source from a reference point of the binaural hearing system and a main direction of the sound source with respect to the preferred direction, and thereby localizing the sound source.

In other words, the above and other objects are achieved, in accordance with the invention, by a method for localizing a sound source for a binaural hearing system having a first hearing instrument and a second hearing instrument, wherein a plurality of first input transducers of the first hearing instrument generates a corresponding plurality of first input signals from a sound signal of the environment, and wherein a plurality of second input transducers of the second hearing instrument generates a corresponding plurality of second input signals from the sound signal of the environment.

According to the novel process, a plurality of first directional signals is generated from the first input signals by means of directional signal processing, in such a way that each of the first directional signals has a minimum sensitivity in a different minimum direction with respect to the preferred direction, and a first source direction of the sound source with respect to the said preferred direction is determined on the basis of the first directional signals, starting from the first hearing instrument, that in addition, a plurality of second directional signals is generated from the second input signals by means of directional signal processing, in such a way that each of the second directional signals has a minimum sensitivity in a different minimum direction with respect to the preferred direction in each case, and a second source direction of the sound source with respect to the said preferred direction is determined on the basis of the second directional signals, starting from the second hearing instrument, and that on the basis of the first source direction, the second source direction and the distance between the first hearing instrument and the second hearing instrument, the distance of the said sound source with respect to the reference point of the binaural hearing system and a main direction of the said sound source with respect to the said preferred direction are determined, and the sound source is thereby localized. Advantageous embodiments, which are inventive in themselves, are the subject matter of the dependent claims and the following description.

A hearing instrument, in this case, generally refers to any device which is designed to generate a sound signal from an electrical signal and to deliver said sound signal to the hearing system of a wearer of this device, thus in particular a headphone (e.g., as an “earplug”), a headset, a pair of data glasses with a loudspeaker, etc. A hearing instrument, however, also includes a hearing device in the narrower sense, that is, a device for treating a hearing impairment of the wearer, in which an input signal generated from an ambient signal by means of a microphone is processed into an output signal and amplified, in particular in a frequency band-dependent manner, and an output sound signal generated from the output signal by means of a loudspeaker or similar device is suitable for compensating for the hearing impairment of the wearer, at least partially, in particular in a user-specific manner.

The term “binaural hearing system” refers to a system comprising two hearing instruments in the above sense, each individual one of which serves to treat one ear of the wearer (i.e., the left or the right ear) and is worn by the wearer on or in the respective ear when operated as intended, so that both ears of the wearer are treated by one hearing instrument each.

An input transducer in this case includes any device which is configured to generate a corresponding electrical signal from an acoustic signal. In particular, the generation of the first or second input signal by the respective input transducer can also include a pre-processing stage, e.g., in the form of a linear pre-amplification and/or an A/D conversion. The input signal generated accordingly is formed in particular by an electrical signal, the current and/or voltage fluctuations of which essentially represent the sound pressure fluctuations of the air.

In each of the two hearing instruments, therefore, from the ambient sound, which preferably comprises at least one useful signal of a corresponding useful signal source, a plurality of first and second input signals is generated by corresponding first and second input transducers, wherein the specific number does not necessarily have to be identical for both hearing instruments. However, the same number of input signals are generated in both hearing instruments.

The concept of directional signal processing comprises in particular a mapping of the signals to be processed by the directional signal processing onto at least one signal resulting from the directional signal processing, which has a non-trivial directional characteristic, i.e., has different sensitivities in at least two different spatial directions as a result of the directional signal processing. In particular, the directional signal processing can be achieved by means of a possibly multi-stage (i.e., cascaded), time-delayed superposition of the signals to be processed, wherein optionally, by means of a primary time-delayed superposition one or more intermediate signals are first generated, which in turn can themselves be superimposed (optionally time-delayed again) in order to generate the resulting signal.

The first input signals are then processed by means of such directional signal processing into a plurality of first directional signals as resulting signals, in such a way that for each of the first directional signals, the direction of minimum sensitivity, i.e., the minimum direction, is rotated by a different angle with respect to a predetermined preferred direction of the binaural hearing system, and hence the minimum direction (in the reference system defined by the preferred direction) for each of the first directional signals is different.

This can be implemented in particular via the parameters of the directional processing (e.g., time constants and/or weights of the superposition). Similar conditions apply to the generation of the second directional signals from the second input signals with respect to the second directional signals, and the corresponding minimum directions for these.

In particular, the said preferred direction of the binaural hearing system is defined on the basis of a frontal direction of the wearer who is wearing the hearing instruments of the hearing system in the intended manner, wherein the intended wearing includes in particular the arrangement of the hearing instruments in or on the respective ear as intended for operation, matching its anatomy. The preferred direction can be determined directly as the frontal direction, or as a function of this, for example via a relative angular deviation that must not be exceeded.

Based on the first directional signals, a first source direction of the sound source is now determined for the first hearing instrument. This can be carried out in particular by taking that signal of the first directional signals which has the lowest signal level, and accordingly attenuating a sound signal of the sound source the most by means of this first directional signal. From this it can preferably be concluded that a direction of the relevant sound source is located nearest to the minimum direction of the given first directional signal. This minimum direction can then be used to determine, at least as an approximation to a direction of the said sound source, the first source direction for the first hearing instrument.

However, in particular, a weighting can also be applied with the minimum directions of other first directional signals, in such a way that, for example, at a maximum attenuation by a specific first directional signal, which is nevertheless only “moderate” (in the sense of comparing relative values with corresponding limit values, relative to, for example, a total level by a preferably omnidirectional reference signal, or to all the other first directional signals), the minimum direction of an adjacent first directional signal can also be used. The first source direction can then be determined in particular on the basis of a plurality of minimum directions and a corresponding weighting according to the respective signal levels of the first directional signals on which they are based.

Preferably, the first directional signals are generated in such a way that their minimum directions are distributed as uniformly as possible over the space, or at least over a contiguous sub-region of the space (e.g., frontal or left or right hemisphere, frontal left or front right quadrant, etc.). Preferably, this also applies to the determination of the second source direction on the basis of the second directional signals.

It is then possible, on the basis of the first and second source direction and the distance between the two hearing instruments, in particular using appropriate triangulation, to determine the distance of the sound source with respect to a reference point of the binaural hearing system as well as a main direction of the sound source with respect to the said preferred direction. In particular, the said reference point of the binaural hearing system is determined on the basis of a mid-point between the first hearing instrument and the second hearing instrument when the system is worn as intended, e.g., directly as the said mid-point or depending on the same, for example via a relative deviation that must not be exceeded.

Usually, for a source in the near field (e.g., up to approximately 2 m, in some cases up to 2.5 or 3 m) the first and second direction differ due to the distance between the two hearing instruments. Based on this distance, which can be measured individually for the wearer, or can be specified from general statistics, and based on the two source directions, the sound source can now be localized in space with respect to the reference point, i.e., its distance from the reference point and its main direction relative to the preferred direction can be determined. Preferably, a source direction is transferred from the hearing instrument used for the determination to the other hearing instrument, so that both source directions are present in both hearing instruments, and the localization can be carried out in both hearing instruments using the same algorithms. Depending on this localization, a corresponding directional signal processing can then be carried out for enhancing the sound source (or else decreasing it if the sound source is identified as a noise source), in other words, an emphasis or suppression of the localized sound source can be carried out, in particular on the basis of the determined distance and the determined main direction of the said sound source.

Preferably, in each of the first and/or second directional signals, speech recognition is carried out on the basis of spectral and/or temporal features, wherein the first or second source direction is implemented on the basis of speech components recognized in the first or second directional signals, and wherein a first speaker is localized as the sound source. In particular, it is thus possible to determine the extent to which a speech component, recognized by means of the spectral and/or temporal features in the respective first or second directional signals, is attenuated in each case.

Advantageously, a specific first or second input signal of a specific first or second input transducer can be used as a first or second reference signal of the first or second hearing instrument respectively, wherein speech recognition is carried out in the first or second reference signal, and wherein the first or second source direction is determined on the basis of differences in speech components recognized in the first or second reference signal with respect to the speech components recognized in the first or second directional signals respectively. The speech components recognized in the first directional signals by means of the speech recognition are thus compared with the speech components recognized in the, preferably omnidirectional, first reference signal in order to selectively determine the attenuation of a speaker by the respective first directional signal.

The same applies to the speech components of the second directional signals with respect to the second reference signal.

Advantageously, in addition, in each of the first and second directional signals, speech recognition is carried out with respect to a second speaker on the basis of corresponding spectral and/or temporal features, and said second speaker is localized as a further sound source. This includes, in particular, the fact that the speech recognition can identify a specific speaker (from more than one) based on the spectral and/or temporal features (e.g., via characteristic features of formants/consonants, speech pauses, etc.), and the speech recognition in the first and second directional signals and in the first and second reference signals is carried out independently of the other with respect to two specific speakers in order to assign first and second source directions to both of them respectively.

Preferably, each of the first directional signals is generated on the basis of a time-delayed superposition of the first input signals, and in the process the minimum direction is adjusted in each case, using at least one time constant and/or at least one weighting factor of the said superposition. Accordingly, each of the second directional signals is preferably generated on the basis of a time-delayed superposition of the second input signals, and in the process the minimum direction is adjusted in each case, using at least one time constant and/or at least one weighting factor of the said superposition. As linear signal processing processes, time-delayed superpositions have the advantage of simple implementation and easily understandable control of the respective angular sizes.

It also proves advantageous in this case if, as the plurality of first input signals, a front first input signal and a rear first input signal are each generated by a corresponding frontal and rear first input transducer, and/or, as the plurality of second input signals, a front second input signal and a rear second input signal are each generated by a corresponding frontal and rear second input transducer. While more than two input signals per hearing instrument can also be used for the method, on the one hand, the use of only two input signals per hearing instrument is already sufficient, and moreover, sufficient for a localization of usable quality. In addition, hearing instruments to be worn on or in the ear are often subject to considerable restrictions in the space available for individual components. When the hearing instrument in question is worn as intended, the respective frontal or rear input transducer is preferably arranged correspondingly further forward or further back in the hearing instrument with regard to the preferred direction (wherein, in addition, a longitudinal displacement, i.e., cranial or caudal, for both input transducers of the same hearing instrument is possible).

In an advantageous embodiment, a head-related transfer function (HRTF) for the first hearing instrument or for the second hearing instrument is also used for adjusting the first minimum direction and/or the second minimum direction. An HRTF describes the spatial filtering effect of the shadowing effects of the head and outer ear (pinna and concha) as a function of angle for sound propagating to the auditory canal. Such shadowing effects may influence the minimum direction for each of the first or second directional signals, and may distort the respectively determined source direction (in comparison to a real direction of the sound source). Taking these effects into account by means of HRTFs thus allows a correction of any such distortion.

It also proves advantageous if the localization of the sound source is carried out in an analysis path of the binaural hearing system, and if an output signal of the binaural hearing system is generated in a processing path parallel to the analysis path. Such an output signal is preferably converted by an output transducer of one of the two hearing instruments into a corresponding output sound signal. The aforementioned subdivision comprises in particular the fact that the first directional signals in the first hearing instrument are all generated in the analysis path on the basis of the first input signals, and also that the described determination of the first source direction takes place in this analysis path. By the second hearing instrument, the second source direction can then be transmitted to the first hearing instrument (both hearing instruments are preferably equipped with appropriate communication devices for the respective transmission), and the sound source can be localized in the analysis path of the first hearing instrument locally. The processing of the first input signals into a first output signal, which can be carried out in particular depending on the localization, is then implemented in a processing path of the first hearing instrument, which is parallel to said analysis path. The division of localization and generation of the first output signal over the analysis and processing path, described here for the first hearing instrument, preferably also applies, mutatis mutandis, to the second hearing instrument and a corresponding second output signal.

It also proves advantageous if a first processing directional signal is generated from the first input signals by means of directional signal processing in such a way that a direction of maximum sensitivity, starting from the first hearing instrument, forms a first yaw angle with the said preferred direction, and if a second processing directional signal is generated from the second input signals by means of directional signal processing in such a way that a direction of maximum sensitivity, starting from the second hearing instrument, forms a second yaw angle with the said preferred direction, wherein the first yaw angle and the second yaw angle are adjusted via the directional signal processing of the first and second input signals respectively, in such a way that a superposition of the first processing directional signal of the first hearing instrument with the second processing directional signal of the second hearing instrument has a maximum sensitivity in an overlap region that includes the sound source localized via the distance and the main direction, and wherein the said sound source is emphasized by the said superposition.

This comprises in particular the fact that the superposition of the two processing directional signals of the first and second hearing instruments results in a signal which, due to its design, has a maximum of its sensitivity at the distance and in the main direction that were determined in each case from the above-described localization. This can be achieved in particular by triangulation using the two yaw angles.

Preferably, the first or second processing directional signal is generated by means of the first or second input signals respectively, in such a way that it has a respective first or second angular width around the first or second yaw angle, within which the sensitivity does not fall below a predetermined minimum value. Conveniently, the first and/or second angular width can then be defined on the basis of the smallest distance of the overlap region from the reference point and/or on the basis of the largest distance of a spatial point of the overlap region from the reference point.

The invention further specifies a binaural hearing system having a first hearing instrument and a second hearing instrument, wherein the binaural hearing system is configured to carry out the above-described method. The binaural hearing system according to the invention shares the advantages of the method according to the invention. The advantages specified for the method and for its extensions can be transferred mutatis mutandis to the binaural hearing system. For carrying out the method, the binaural hearing system is equipped in particular with the corresponding input transducers and additionally with means for directional signal processing and means for transmitting both respectively required input and/or directional signals and direction information between the two hearing instruments.

Other features which are considered as characteristic for the invention are set forth in the appended claims.

Although the invention is illustrated and described herein as being embodied in a method for localizing a sound source for a binaural hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Equivalent parts and dimensions are provided with identical reference signs and symbols throughout the figures.

DETAILED DESCRIPTION OF THE INVENTION

Figure 1:
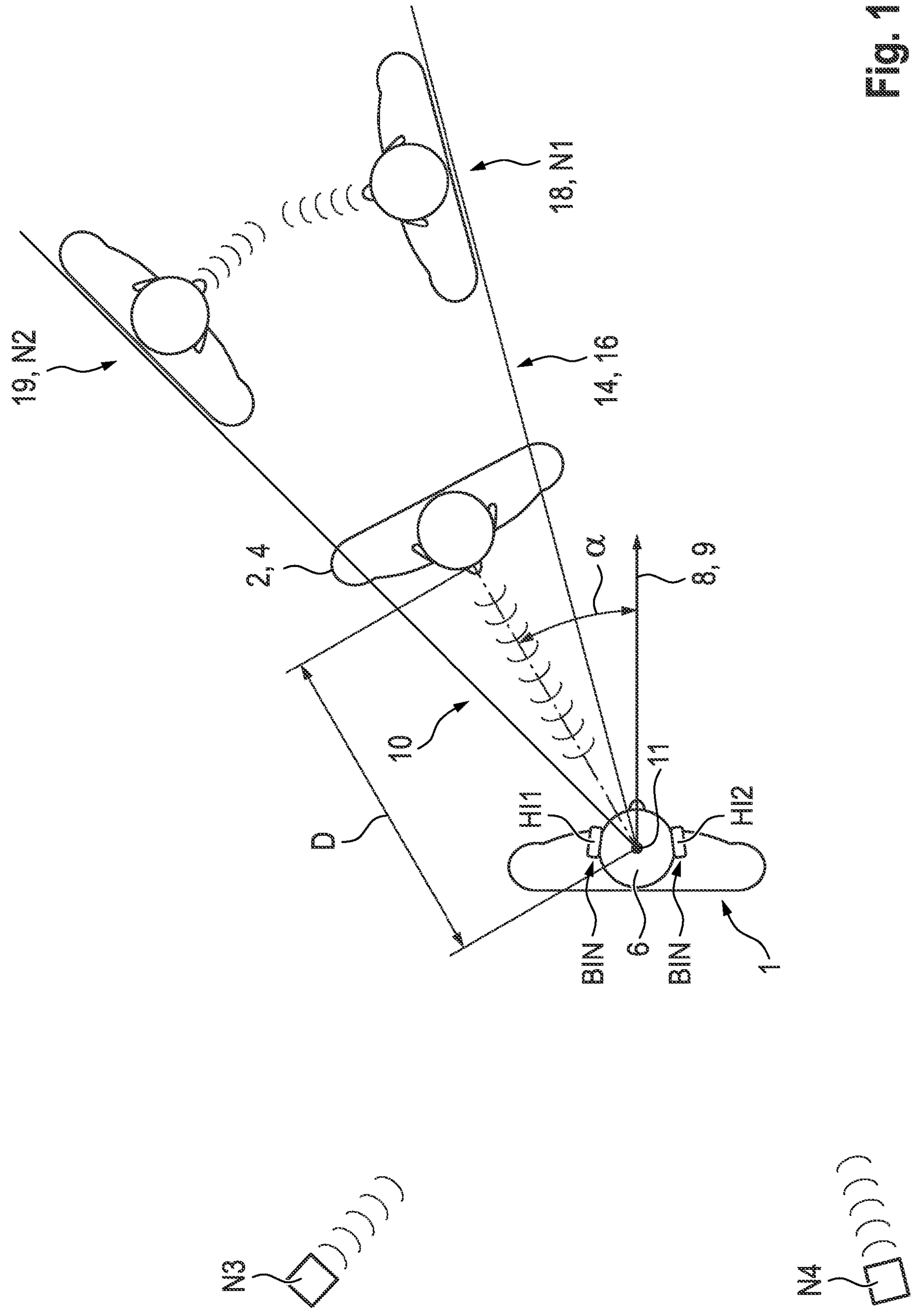
FIG. 1 is a schematic plan view of a wearer of a binaural hearing system in a conversation situation in the presence of noise signals.

Referring now to the figures of the drawing in detail and first, in particular, to FIG. 1 thereof, there is shown a schematic plan view of a wearer 1 of a binaural hearing system BIN, having a first hearing instrument HI1 and a second hearing instrument HI2. The wearer 1 in this case is in a conversation situation with an interlocutor 2, who is thus interpreted for the signal processing of the binaural hearing system BIN as a useful signal source 4. The wearer 1 in the present case does not have their head 6 and thus its frontal direction 8 oriented toward the interlocutor 2, but positioned slightly offset in a main direction α relative to them (a is intended here to designate both the direction of the interlocutor 2 as well as the angle that this direction forms with the frontal direction 8 of the wearer 1). The frontal direction 8, or forward direction 8, in this case forms a preferred direction 9 for the binaural hearing system BIN.

To improve the sound impression of the conversation situation during reproduction by the hearing instrument HI, by means of directional signal processing of input signals generated in the first and second hearing instrument HI1, HI2, an output signal is generated from a sound signal 10 of the environment of the wearer 1 in each case and supplied to the hearing system of the wearer 1. To obtain a maximally targeted signal processing for generating the said output signal, a most accurate localization of the useful signal source 4 is desirable. For the localization this involves determining not only the main direction α with respect to the preferred direction 9, but also determining a distance D between the useful signal source 4 (i.e., of the interlocutor 2) and a reference point 11 of the binaural hearing system BIN.

The background to this is as follows: a directional signal 14 generated in the main direction α (characterized by its directional cone 16) has its maximum sensitivity in this direction, wherein a high sensitivity is also obtained within the illustrated directional cone 16. However, within this directional cone 16, two further persons 18, 19 in their own conversation with each other are located slightly further away than the interlocutor 2 relative to the wearer 1. For the wearer 1 of the binaural hearing system BIN, the persons 18, 19 each represent noise sources N1, N2, since they are also amplified by the directional signal 14, unlike the noise sources N3, N4, for example, which are decreased by the directional signal 14. If an output signal of the binaural hearing system BIN is thus generated on the basis of the directional signal 14, the SNR for the useful signal coming from the interlocutor 2 is reduced due to the directional amplification of the noise sources N1, N2 by the directional signal 14. In order to choose a different directional signal processing than that given by the directional signal 14, in a manner still to be described, the binaural hearing system BIN therefore determines not only the main direction α of a sound source (i.e., in the present case, the useful signal source 4), but also its distance D from the reference point 11.

Figure 2:
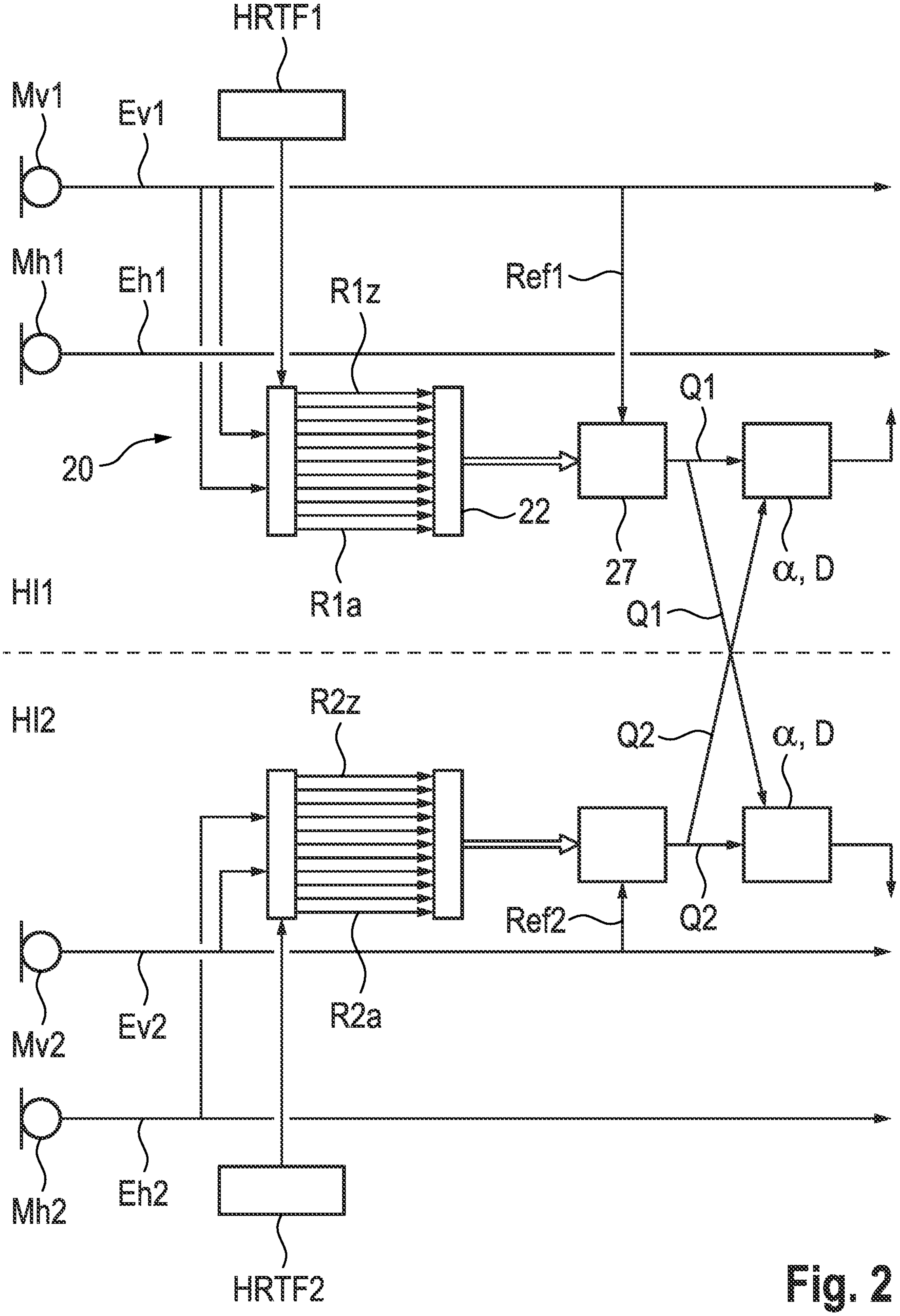
FIG. 2 is a flowchart of the sequence of a method in the binaural hearing system according to FIG. 1 for localizing a sound source.

In FIG. 2, the sequence of a method in the binaural hearing system BIN is shown schematically in a flow diagram, by means of which a sound source such as the useful signal source 4 according to FIG. 1 can be localized.

The first hearing instrument HI1 has a frontal first input transducer Mv1 and a rear first input transducer Mh1, which each generate a front first input signal Ev1 and a rear first input signal Eh1 from the sound signal 10 of the environment. The second hearing instrument HI2 has a frontal first input transducer Mv2 and a rear second input transducer Mh2, which each generate a front second input signal Ev2 and a rear second input signal Eh2 from the sound signal 10 of the environment. The input transducers Mv1, Mh1, Mv2, Mh2 in the present case are provided by corresponding omnidirectional microphones.

In an analysis path 20 of the first hearing instrument HI1, a plurality of first directional signals R1*a-z* is generated from the front and rear first input signal Ev1, Eh1, taking into account a first HRTF (labeled in FIG. 2 as HRTF1) of the first hearing instrument HI1. The first directional signals R1*a-z* are generated in such a way that they each have their minimum sensitivity in different angular directions in space ("minimum directions"), wherein the said minimum directions preferably cover the space or at least a contiguous sub-region of it (such as the front hemisphere) as uniformly as possible. These first directional signals RA1*a-z* thus "scan", in each case via the variation of their minimum directions, the space (or optionally the front hemisphere) surrounding the first hearing instrument HI1 for sound sources, wherein a sound source present in a minimum direction of a particular first directional signal R1*a-z* is attenuated by the same.

To identify a sound source, speech recognition 22 is now applied to the first directional signals R1*a-z*, in order to identify a speech component in the respective first directional signal R1*a-z*. In addition, the front first input signal Ev1 of the first hearing instrument HI1 is used as a first reference signal Ref1 for the analysis path 20. The first reference signal Ref1 is now also submitted to a speech recognizer 23 in order to identify a speech component there. Since the associated frontal first input transducer Mv1 is formed by an omnidirectional microphone, the first reference signal Ref1 essentially contains the full speech component of a speaker as the sound source. By a comparison 27 of the speech components identified in the first directional signals R1*a-z* in each case with the speech component that was determined in the first reference signal Ref1, it can be established which of the first directional signals R1*a-z* attenuates a speaker the most. On the basis of the minimum direction of the corresponding first directional signal therefore, a first source direction Q1 for the sound source with respect to the first hearing instrument HI1 can be determined.

A comparable signal processing is carried out in an analysis path (not specified in detail) of the second hearing instrument HI2, wherein based on the front and rear second input signal Ev2, Eh2, taking into account the associated HRTF (HRTF2), a plurality of second directional signals R2*a-z* with different minimum directions in each case is formed. Based on these second directional signals R2*a-z* and on the front second input signal Ev2 as a second reference signal Ref2, a second source direction Q2 for the sound source with respect to the second hearing instrument HI2 is then determined in the manner already described and using respective speech recognition processes.

A main direction α and a distance D of the sound source provided by the interlocutor 2 of FIG. 1 with respect to the binaural hearing system BIN (and its preferred direction 9) can then be determined from the two source directions Q1, Q2 for the interlocutor 2 identified in the individual hearing instruments HI1, HI2 respectively and from the distance between the hearing instruments HI1, HI2, for which the identified first and second source direction Q1, Q2 are transmitted to the respective other hearing instrument HI2, HI1 by means of suitable communication devices (e.g., Bluetooth and/or NFC-enabled antennas), and the same steps for determining the main direction α and distance D are carried out in both hearing instruments HI1, HI2. This localizes a speaker as a sound source (e.g., the interlocutor 2).

Figure 3:
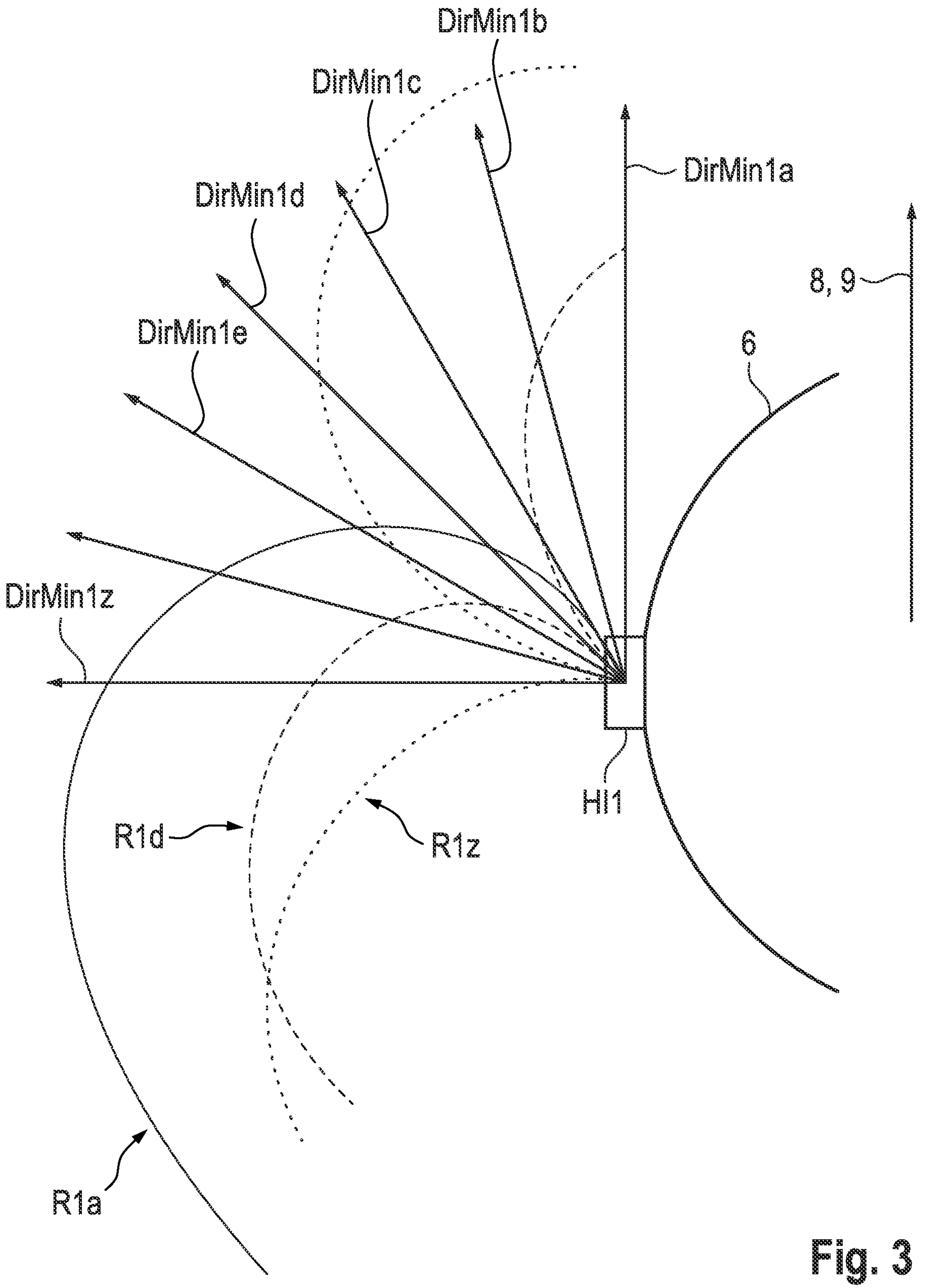
FIG. 3 is a plan view of directional signals of the method according to FIG. 2.

In FIG. 3, schematically in a plan view, examples of individual directional effects of first directional signals R1*a-z* of the first hearing instrument HI1 according to FIG. 2 are shown using their respective directional characteristics. For a simplified representation, the influence of the shading by the head 6 or the influence of the HRFT on the first directional signals R1*a-z* has been ignored. Nevertheless, the fundamental considerations remain valid.

A first directional signal R1*a* (solid line) attenuated to the front has an anti-cardioid directional characteristic. Accordingly, a minimum direction DirMin1*a*, in which this directional signal has a minimum sensitivity, coincides with the frontal direction 8. Another first directional signal R1*d* (dashed line) has a minimum direction DirMin1*d* rotated relative to the frontal direction 8. A first directional signal R1*z* (dotted line), which is attenuated at the side, has a directional characteristic in the form of an 8 and accordingly a minimum direction DirMin1*z* twisted by 90° relative to the frontal direction. For further first directional signals, only their respective minimum directions DirMin1*b/c*, DirMin1*e-y* are shown, which at present cover the front left quadrant, largely uniformly.

Figure 4:
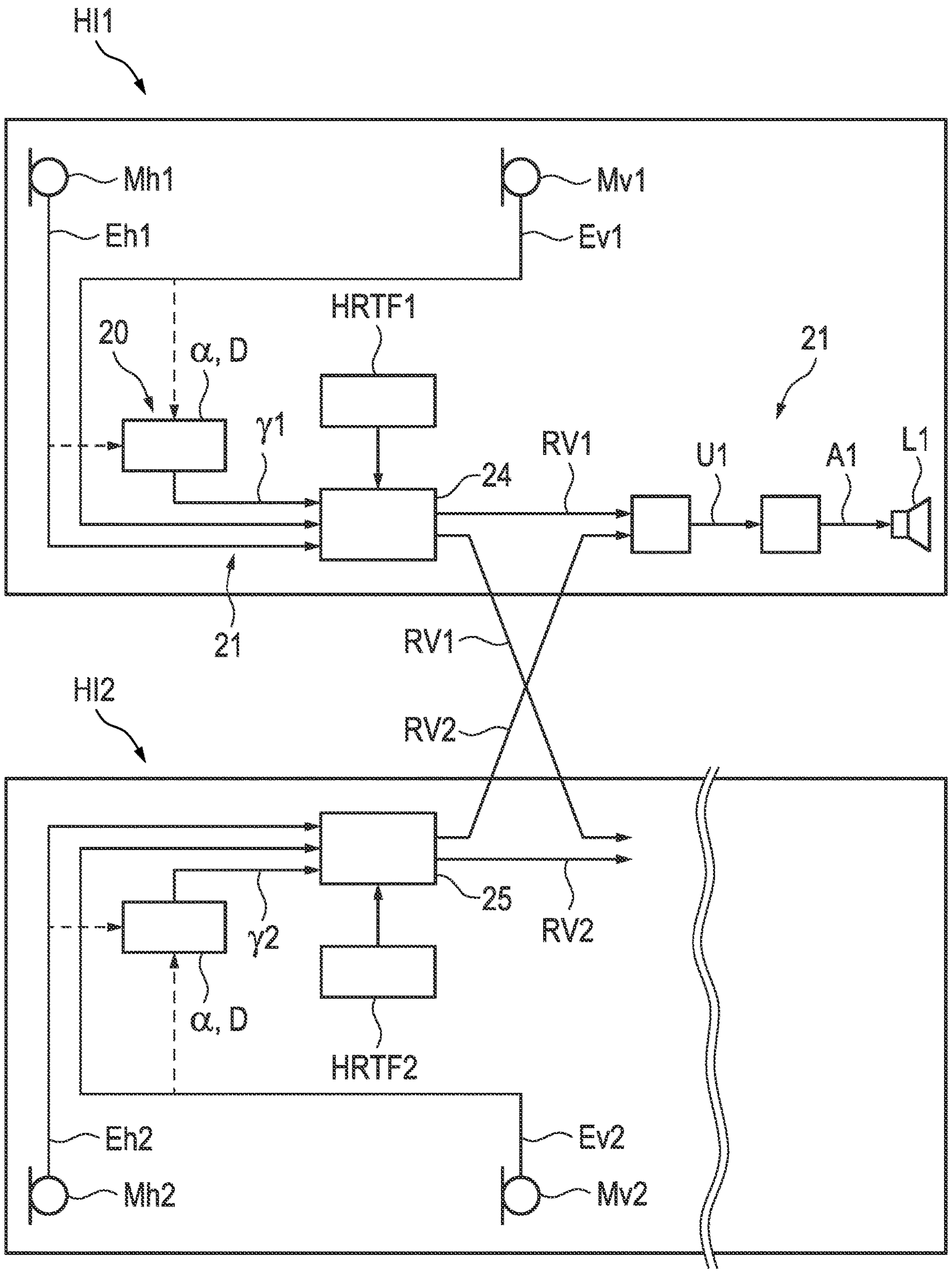
FIG. 4 shows a block circuit diagram of an application of the localization of a sound source according to FIG. 2.

FIG. 4 shows a schematic view of an application of the localization of a sound source according to FIG. 2, in the form of a block circuit diagram. The application here involves decreasing, or even masking completely, the noise sources N1, N2 according to FIG. 1 compared to the conversation contributions of the interlocutor 2 in an output signal.

In the first hearing instrument HI1, for this purpose on the basis of the front and rear first input signal Ev1, Eh1 (the corresponding input transducers MV1, Mh1 are here shown schematically one behind the other to reflect their spatial arrangement to each other) and on the basis of the main direction α, determined as described, and the distance D of a sound source from the reference point 11 a first processing directional signal RV1 is formed by means of directional signal processing 24. For this purpose, in the present exemplary embodiment a time-delayed superposition is formed from the said input signals Ev1, Eh1 in a processing path 21 of the first hearing instrument HI1, and in particular the first HRTF (referred to in FIG. 4 as HRTF1) of the first hearing instrument HI1 is used. The first processing directional signal RV1 is thereby adjusted by the directional signal processing 24 in such a way that its direction of maximum sensitivity with respect to the preferred direction 9 forms a first yaw angle γ1.

In a similar manner, on the basis of the front and rear second input signal Ev2, Eh2, taking into account a second HRTF (HRTF2) a second directional signal RV2 is formed in the second hearing instrument HI2 by directional signal processing 25, the direction of maximum sensitivity or preferred direction 9 of which forms a second yaw angle γ2.

The second directional signal R2 is then transmitted from the second hearing instrument HI2 to the first hearing instrument HI1. For this purpose, the previously mentioned communication devices of the two hearing instruments HI1, HI2 are preferably used.

In the first hearing instrument HI1, a first superposition U1 is then formed from the first directional signal RV1 and the second directional signal RV2 in the processing path 21 (here, U1 designates both the process of the first superposition and the signal resulting from the first superposition). From the signal of the first superposition U1, a first output signal A1 is generated in the first hearing instrument, which is then reproduced by a first output transducer L1 of the first hearing instrument HI1 as an output sound signal (not shown) and supplied to the hearing system of the wearer 1. The first output transducer L1 can be formed in particular as a loudspeaker. However, the first output transducer L1 can also be formed as a bone-conduction headset or similar. The signal of the first superposition U1 may be subject to further signal processing steps (such as frequency band-dependent amplification and/or compression) for generating the first output signal A1.

In a similar manner, from the first directional signal R1 and the second directional signal R2, a second superposition (not shown) is formed in the second hearing instrument HI2 from which, optionally by additional signal processing (see above), a second output signal for a second output transducer of the second hearing instrument HI2 is generated.

The first and the second yaw angle γ1, γ2 are each thereby adjusted by the relevant directional signal processing 24, 25, taking into account the distance between the first and the second hearing instrument HI1, HI2, in such a way that corresponding angular rays emanating from the first and second hearing instrument HI1, HI2 respectively, intersect as closely as possible to the point given by the distance D and the main direction α. The first superposition U1 of the form a. $U1(f,k)=RV1(f,k)+RV2(f,k),$ where k is a discrete time index, and f is a frequency band index, is thereby "focused" onto the sound source localized at the distance D and in the main direction α, whereby the sound source is enhanced accordingly.

Although the invention has been illustrated and described in greater detail by means of the preferred exemplary embodiment, the invention is not restricted by the examples disclosed and other variations can be derived therefrom by the person skilled in the art without departing from the scope of protection of the invention.

The following is a summary list of reference numerals and the corresponding structure used in the above description of the invention:

1 wearer
2 interlocutor
4 useful signal source
6 head
8 frontal direction
9 preferred direction
10 sound signal
11 reference point
14 directional characteristic
16 directional cone
18 person
19 person
20 analysis path
21 processing path
22 speech recognition
23 speech recognition
24 directional signal processing
25 directional signal processing
27 comparison
A1 first output signal
BIN binaural hearing system
D distance
DirMin1*a-z* minimum direction (of the first directional signals)
Ev1/2 front first/second input signal
Eh1/2 rear first/second input signal
HI1/2 first/second hearing instrument
L1 first output transducer
Mv/h1/2 frontal/rear first/second input transducer
N1-4 noise source
Q1/2 first/second source direction
R1/2*a-z* first/second directional signals
RV1/2 first/second processing directional signal
Ref1/2 first/second reference signal
U1 first superposition
α main direction
γ1/2 first/second yaw angle

The invention claimed is:

1. A method for localizing a sound source for a binaural hearing system having a first hearing instrument and a second hearing instrument, the method comprising:

generating, by a plurality of first input transducers of the first hearing instrument, a plurality of first input signals from an ambient sound signal;

generating, by a plurality of second input transducers of the second hearing instrument, a plurality of second input signals from the ambient sound signal;

generating a plurality of first directional signals based on the first input signals by way of directional signal processing, such that each of the first directional signals has a minimum sensitivity in a different minimum direction with respect to a preferred direction of the binaural hearing system, and determining on a basis of the first directional signals a first source direction of the sound source with respect to the said preferred direction, starting from the first hearing instrument;

generating a plurality of second directional signals based on the second input signals by way of directional signal processing, such that each of the second directional signals has a minimum sensitivity in a different minimum direction with respect to the preferred direction, and determining on a basis of the second directional signals a second source direction of the sound source with respect to the preferred direction, starting from the second hearing instrument; and determining, based on the first source direction, the second source direction, and a distance between the first and second hearing instruments, a distance of the sound source from a reference point of the binaural hearing system and a main direction of the sound source with respect to the preferred direction, and thereby localizing the sound source.

2. The method according to claim 1, which comprises:

carrying out, in each of the first or second directional signals, speech recognition on a basis of at least one of spectral or temporal features;

implementing the first or second source directions on a basis of speech components recognized in the first or second directional signals respectively; and localizing a first speaker as the sound source.

3. The method according to claim 2, which comprises:

using a specific first input signal of a specific first input transducer as the first reference signal;

carrying out the speech recognition in the first reference signal; and determining the first source direction based on differences of speech components recognized in the first reference signal with respect to the speech components recognized in the first directional signals;

and/or using a specific second input signal of a specific second input transducer as the second reference signal;

carrying out the speech recognition in the second reference signal; and determining the second source direction based on differences of speech components recognized in the second reference signal with respect to the speech components recognized in the second directional signals.

4. The method according to claim 2, which comprises carrying out the speech recognition in each of the first and second directional signals with respect to a second speaker based on corresponding spectral and/or temporal features, and localizing the second speaker as a further sound source.

5. The method according to claim 1, which comprises one or both of the following steps:

generating each of the first directional signals on a basis of a time-delayed superposition of the first input signals, and in the process adjusting the minimum direction using at least one time constant and/or at least one weighting factor of the superposition; or generating each of the second directional signals on a basis of a time-delayed superposition of the second input signals, and in the process adjusting the minimum direction using at least one time constant and/or at least one weighting factor of the superposition.

6. The method according to claim 5, which comprises at least one of the following steps:

as a plurality of first input signals, generating a front first input signal and a rear first input signal by a corresponding frontal or rear first input transducer respectively; or as a plurality of second input signals, generating a front second input signal and a rear second input signal by a corresponding frontal or rear second input transducer respectively.

7. The method according to claim 5, which comprises in addition using a head-related transfer function for the first hearing instrument or for the second hearing instrument for adjusting the respective minimum direction for the first and second directional signals respectively.

8. The method according to claim 1, which comprises:

localizing the sound source in an analysis path of the binaural hearing system; and generating an output signal of the binaural hearing system in a processing path parallel to the analysis path.

9. The method according to claim 1, which comprises selectively emphasizing or suppressing the localized sound source on a basis of the determined distance and the determined main direction of the sound source.

10. The method according to claim 9, which comprises:

generating a first processing directional signal from the first input signals by way of directional signal processing, such that a direction of maximum sensitivity, starting from the first hearing instrument, forms a first yaw angle with the preferred direction;

generating a second processing directional signal from the second input signals by way of directional signal processing, such that a direction of maximum sensitivity, starting from the second hearing instrument, forms a second yaw angle with the preferred direction;

adjusting the first yaw angle and the second yaw angle via the directional signal processing of the first and second input signals, in such a way that a superposition of the first processing directional signal of the first hearing instrument with the second processing directional signal of the second hearing instrument has a maximum sensitivity in an overlap region that includes the sound source localized via the distance and the main direction; and emphasizing the sound source with the superposition.

11. A binaural hearing system, comprising a first hearing instrument and a second hearing instrument, and wherein the binaural hearing system is configured to carry out the method according to claim 1.

* * * * *